US012092062B2

(12) United States Patent
Benson

(10) Patent No.: US 12,092,062 B2
(45) Date of Patent: Sep. 17, 2024

(54) METHODS AND SYSTEMS FOR DETERMINING EFFECTIVE STEADY STATE FLOW RATE FOR FUEL INJECTORS

(71) Applicant: Cummins Inc., Columbus, IN (US)

(72) Inventor: Donald J. Benson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/499,629

(22) Filed: Nov. 1, 2023

(65) Prior Publication Data

US 2024/0060466 A1 Feb. 22, 2024

Related U.S. Application Data

(63) Continuation of application No. PCT/US2022/018436, filed on Mar. 2, 2022.
(Continued)

(51) Int. Cl.
*F02M 65/00* (2006.01)
*F02D 41/22* (2006.01)
(Continued)

(52) U.S. Cl.
CPC ........... *F02M 65/003* (2013.01); *F02D 41/22* (2013.01); *G07C 5/008* (2013.01); *G07C 5/0808* (2013.01);
(Continued)

(58) Field of Classification Search
CPC . F02M 65/003; F02D 41/22; F02D 2041/224; G07C 5/0808
See application file for complete search history.

(56) References Cited

U.S. PATENT DOCUMENTS 5,445,019 A 8/1995 Glidewell et al.
8,897,996 B2 11/2014 Massaro
(Continued)

FOREIGN PATENT DOCUMENTS

DE 102018210708 1/2020
WO 2008150373 12/2008
WO 2017021091 2/2017

OTHER PUBLICATIONS

International Search Report and Written Opinion, PCTUS2218436, Jun. 1, 2022, 7 pgs.

*Primary Examiner* — John Kwon
(74) *Attorney, Agent, or Firm* — Taft, Stettinius & Hollister LLP

(57) ABSTRACT

Provided are methods and fuel injection systems implemented with a plurality of injectors coupled with a common rail, the common rail coupled with a pressure sensor, and the pressure sensor coupled with a processor. The method includes: identifying, by the processor, one of the injectors to calculate a pressure change rate of the common rail associated therewith; receiving, by the processor, pressure measurements of the common rail from the pressure sensor before and during an injection event within a measurement window; using, by the processor, a pre-injection mean pressure of the common rail to determine a rail pressure drop range that is specific to the identified injector; and calculating, by the processor, the pressure change rate associated with the identified injector based on the pressure measurements of the common rail taken during the rail pressure drop range.

15 Claims, 9 Drawing Sheets

Related U.S. Application Data

(60) Provisional application No. 63/185,527, filed on May 7, 2021.

(51) Int. Cl.
*G07C 5/00* (2006.01)
*G07C 5/08* (2006.01)

(52) U.S. Cl.
CPC .................. *F02D 2041/224* (2013.01); *F02D 2200/0602* (2013.01); *F02M 2200/247* (2013.01)

(56) References Cited

U.S. PATENT DOCUMENTS

| | | | | |
|---|---|---|---|---|
| 10,533,514 | B2 | 1/2020 | Garimella et al. | |
| 2002/0157646 | A1* | 10/2002 | Hiraku | F04B 49/243 123/456 |
| 2006/0144367 | A1* | 7/2006 | Futonagane | F02M 47/027 123/446 |
| 2006/0283425 | A1* | 12/2006 | Tsutsui | F02D 41/3836 123/478 |
| 2008/0059039 | A1* | 3/2008 | Nakagawa | F02D 41/2464 701/99 |
| 2009/0164095 | A1 | 6/2009 | Geveci et al. | |
| 2011/0067679 | A1* | 3/2011 | Hitomi | F02D 41/402 123/564 |
| 2013/0125862 | A1 | 5/2013 | Sahashi | |
| 2014/0224219 | A1 | 8/2014 | Carey et al. | |
| 2015/0275810 | A1* | 10/2015 | Tanaka | F02P 19/026 701/105 |
| 2016/0017837 | A1 | 1/2016 | Carey et al. | |
| 2018/0156154 | A1 | 6/2018 | Hoffmann et al. | |
| 2019/0331050 | A1 | 10/2019 | Hirchenhein et al. | |
| 2020/0200117 | A1 | 6/2020 | Matsuo et al. | |

* cited by examiner

METHODS AND SYSTEMS FOR DETERMINING EFFECTIVE STEADY STATE FLOW RATE FOR FUEL INJECTORS

CROSS-REFERENCE TO RELATED APPLICATION

This application is a continuation of International Application No. PCT/US2022/018436 filed Mar. 2, 2022 which claims priority to U.S. Provisional Application No. 63/185,527, filed on May 7, 2021, which are hereby incorporated by reference.

FIELD OF THE DISCLOSURE

The present disclosure relates generally to fuel injection systems and more specifically to methods and systems for estimating injection rate of the injectors in the fuel injection system.

BACKGROUND OF THE DISCLOSURE

Cup flow during a fuel injection operation, also referred to as an effective steady state flow rate of fuel injectors and typically measured in pounds per hour (pph) or grams per second (g/s), may change as a result of operation. The causes of such change in the effective steady state flow rate may include spray hole coking, spray hole cavitation, spray hole erosion, and/or presence of debris plugging the fuel injection pathway. Such changes in the effective steady state flow rate affect the fuel injector's injection rate shape and the injection quantity which could affect the engine's operation, such as reduced efficiency, increased emissions or exhaust level, and/or inaccurate fuel metering. As such, further contributions are needed in this area of technology to implement a method for estimating the engine's effective steady state flow rate with accuracy.

SUMMARY OF THE DISCLOSURE

According to the present disclosure, methods are implemented in a fuel injection system, where the injection system includes a plurality of injectors coupled with a common rail, the common rail coupled with a pressure sensor, and the pressure sensor coupled with a processor. An exemplary method includes: identifying, by the processor, one of the injectors to calculate a pressure change rate of the common rail associated therewith; receiving, by the processor, pressure measurements of the common rail from the pressure sensor before and during an injection event within a measurement window; using, by the processor, a pre-injection mean pressure of the common rail to determine a rail pressure drop range that is specific to the identified injector; and calculating, by the processor, the pressure change rate associated with the identified injector based on the pressure measurements of the common rail taken during the rail pressure drop range.

In some examples, the method includes estimating, by the processor, an effective steady state flow rate of the identified injector based on the calculated pressure change rate associated with the identified injector. In some examples, the method further includes: calculating, by the processor, a plurality of pressure change rates associated with the plurality of injectors; and estimating, by the processor, a plurality of effective steady state flow rates of the injectors based on the plurality of calculated pressure change rates associated with the injectors.

In some examples, the method further includes: calculating, by the processor, an average effective steady state flow rate based on the plurality of effective steady state flow rates; and using, by the processor, the average effective steady state flow rate to determine an error in the estimated effective steady state flow rates of the injectors. In some examples, the method further includes using, by the processor, the effective steady state flow rates of the injectors in an injector control algorithm. In some examples, the method further includes estimating, by the processor, a percent change in an effective steady state flow rate of the identified injector relative to a nominal steady state flow rate of the identified injector based on the calculated pressure change rate associated with the identified injector.

In some examples, the rail pressure drop range is determined using a first pressure drop and a second pressure drop greater than the first pressure drop. In some examples, the pressure measurements of the common rail are taken in a non-hovering zone of the injector in which an injected fuel amount thereof does not initiate hovering of a lower plunger in the injector.

In some examples, the method includes the processor determining that a suitable condition is met to receive the pressure measurements. The suitable condition may include one or more of the following: (1) an engine coolant is within a required temperature range, (2) a pressure of the common rail is above a minimum threshold, (3) an injected fuel amount is above the minimum threshold, or (4) any potential pumping events which would overlap with the measurement window are disabled. In some examples, the pressure measurements are received at a frequency which provides the processor with enough datapoints to identify a sufficiently linear pressure decline in the pressure measurements for calculating the pressure change via a linear regression.

Also disclosed in the disclosure are fuel injection systems having a common rail, a pressure sensor coupled with the common rail, a plurality of injectors coupled with the common rail, and a processor coupled with the pressure sensor. The processor is configured to identify one of the injectors to calculate a pressure change rate of the common rail associated therewith, receive pressure measurements of the common rail from the pressure sensor before and during an injection event within a measurement window, use a pre-injection mean pressure of the common rail to determine a rail pressure drop range that is specific to the identified injector, and calculate the pressure change rate associated with the identified injector based on the pressure measurements of the common rail taken during the rail pressure drop range.

In some examples, the processor is operable to estimate an effective steady state flow rate of the identified injector based on the calculated pressure change rate associated with the identified injector. In some examples, the processor is further operable to calculate a plurality of pressure change rates associated with the plurality of injectors and estimate a plurality of effective steady state flow rates of the injectors based on the plurality of calculated pressure change rates associated with the injectors.

In some examples, the processor is further operable to calculate an average effective steady state flow rate based on the plurality of effective steady state flow rates and use the average effective steady state flow rate to determine an error in the estimated effective steady state flow rates of the injectors. In some examples, the processor is further operable to use the effective steady state flow rates of the injectors in an injector control algorithm. In some examples, the processor is further operable to estimate a percent change in an effective steady state flow rate of the identified injector relative to a nominal steady state flow rate of the identified injector based on the calculated pressure change rate associated with the identified injector.

In some examples, the rail pressure drop range is determined using a first pressure drop and a second pressure drop greater than the first pressure drop. In some examples, the pressure measurements of the common rail are taken in a non-hovering zone of the injector in which an injected fuel amount thereof does not initiate hovering of a lower plunger in the injector. In some examples, the processor is a remote processor, and the fuel injection system further includes a secondary on-board processor physically coupled with the pressure sensor and communicably coupled with the remote processor via a wireless communication network.

Also disclosed herein are vehicles including a fuel injection system as disclosed above and an engine coupled with the fuel injection system. The engine includes a crankshaft and a plurality of cylinders coupled with the crankshaft via a corresponding plurality of connecting rods. The plurality of cylinders includes a plurality of pistons which cause the crankshaft to rotate via the plurality of connecting rods in response to receiving fuel from the plurality of injectors. In some examples, the processor is an on-board processor physically coupled with the pressure sensor. In some examples, the processor is a remote processor communicably coupled with the vehicle via a wireless communication network and is capable of receiving the pressure measurements of the common rail from the pressure sensor via a secondary on-board processor physically coupled with the pressure sensor. In some examples, the non-transitory computer readable medium is a remote data server.

Additional features and advantages of the present disclosure will become apparent to those skilled in the art upon consideration of the following detailed description of the illustrative embodiment exemplifying the best mode of carrying out the disclosure as presently perceived.

BRIEF DESCRIPTION OF THE DRAWINGS

The detailed description of drawings particularly refers to the accompanying figures in which.

DETAILED DESCRIPTION

The embodiments of the disclosure described herein are not intended to be exhaustive or to limit the disclosure to the precise forms disclosed. Rather, the embodiments selected for description have been chosen to enable one skilled in the art to practice the disclosure.

One of ordinary skill in the art will realize that the embodiments provided can be implemented in hardware, software, firmware, and/or a combination thereof. For example, the controllers disclosed herein may form a portion of a processing subsystem including one or more computing devices having memory, processing, and communication hardware. The controllers may be a single device or a distributed device, and the functions of the controllers may be performed by hardware and/or as computer instructions on a non-transitory computer readable storage medium. For example, the computer instructions or programming code in the controller (e.g., an electronic control module ("ECM")) may be implemented in any viable programming language such as C, C++, HTML, XTML, JAVA or any other viable high-level programming language, or a combination of a high-level programming language and a lower level programming language.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

Figure 1:
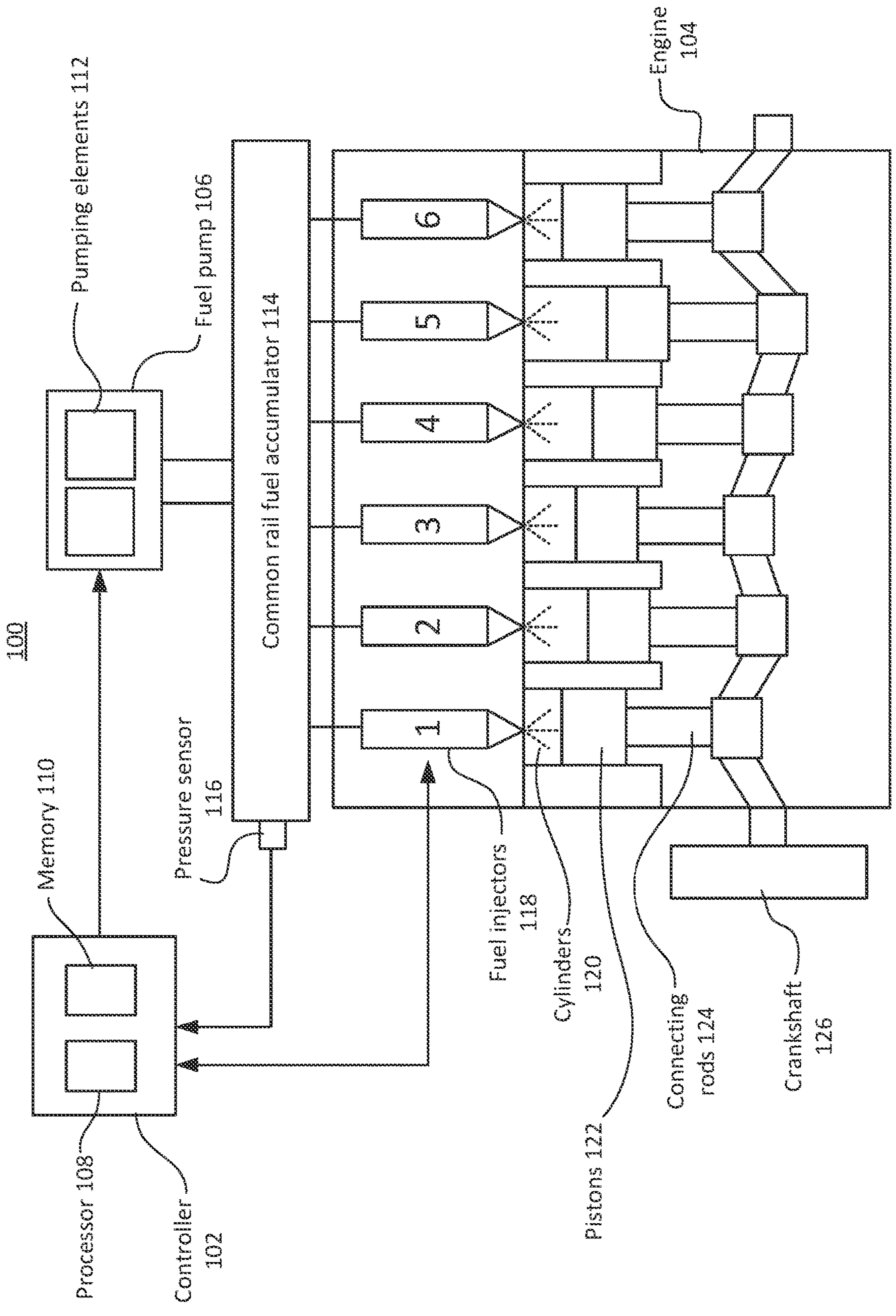
FIG. 1 shows a schematic diagram of a fuel injection system according to embodiments disclosed herein.

Referring to FIG. 1, portions of a fueling system 100 implemented with an engine 104 are shown. Fueling system 100 generally includes a controller 102, a fuel pump 106, a common rail fuel accumulator 114, also referred to as a common rail, and a plurality of fuel injectors 118. Engine 104 generally includes a plurality of cylinders 120 in which a plurality of pistons 122 reciprocate under power provided by fuel combustion, thereby causing a crankshaft 126 to rotate via a corresponding plurality of connecting rods 124. Fuel pump 106, which is depicted in this example as having two pumping elements 112, receives fuel from a fuel source (e.g., a fuel tank, not shown), pressurizes the fuel, and provides the pressurized fuel to accumulator 114. Fuel injectors 118, which are coupled to and receive fuel from accumulator 114 under control of controller 102, deliver fuel (also under control of controller 102) to cylinders 120 at specified times during the engine cycle as is well known in the art. The injectors 118 are each identified with a unique number or letter, referred to herein as injector identifier or injector ID. In the example shown, there are six injectors 118 and as such each one has an injector ID that is a number chosen from 1 through 6. Each injector 118 may have a different flow rate from one another for various reasons explained herein.

The highly simplified controller 102 shown in FIG. 1 includes a processor 108 and a memory 110. The controller 102 may be substantially more complex and may include multiple processors and memory devices as well as a plurality of other electronic components. In this example, controller 102 receives pressure measurements from a pressure sensor 116 coupled to accumulator 114. The pressure measurements indicate the pressure of fuel in accumulator 114. Controller 102 controls operation of pump 106 in response to the pressure measurements and/or other measurements that will be described below. More specifically, controller 102 controls the delivered pumping output for each pumping element 112. In other words, the controller 102 controls one or more valves (e.g., an inlet valve, not shown) that provide fuel from the fuel source or tank to the pumping element 112.

Figure 2B:
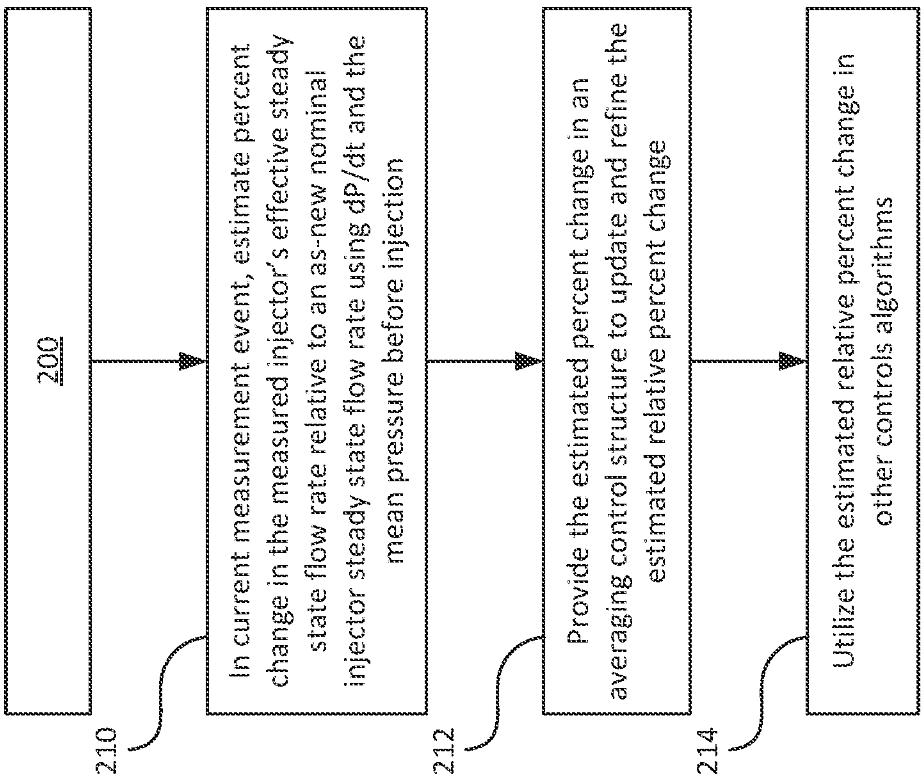
FIGS. 2A and 2B show flow diagrams of methods of calculating a rate of change in the rail pressure and using the determined rate of change according to embodiments disclosed herein.
Figure 2A:
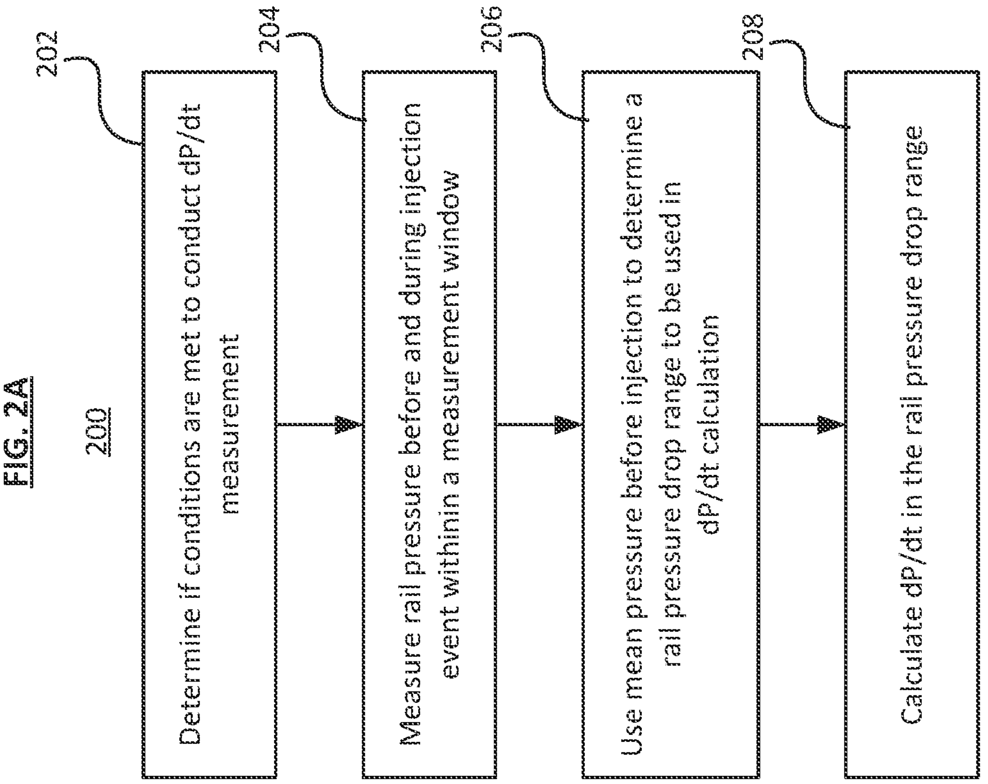

FIG. 2A shows a method 200 which may be implemented by the processor 108 of the controller 102, for example an electrical control unit (ECU). In step 202, the processor determines if conditions are met for the processor to conduct a measurement to determine a rate of change in the rail pressure (hereinafter referred to as dP/dt, measurable in bars/millisecond, for example). The value of dP/dt is a function of the rail pressure and the injector itself. That is, the value of dP/dt differs for each injector 118. The hydraulic layout of each injector 118 differs relative to all the other injectors 118. For example, with certain hydraulic and pump configurations, the line to only injector no. 1 (as shown in FIG. 1, for example) is on one side of the common rail 114 relative to the lines from the pump 106 to the rail 114 from all other injectors 118. The distances from injectors 118 to the rail pressure transducer also differs between the injectors 118.

The dP/dt measurements associated with each injection event may depend on factors including the rate of fuel removal from the pressurized system, the effective steady state flow, injection pressure, pilot valve flow rate, pressurized system volume, and fuel properties such as sonic speed, bulk modulus, and density. The sensitivity of the change in slope dP/dt is variable and depends on factors including, but not limited to: a magnitude of the pressure drop range of the pressure data used in the dP/dt measurement, a high-pressure system volume, an effective steady state flow rate of the injector, and/or the configuration of the injector which affects the duration at which the effective steady state flow rate of the injector occurs. In some examples, the sensitivity of the change in slope dP/dt may be approximately half of the change in the effective steady state flow rate for the pressure drop range. That is, in some examples, a 10% change in the effective steady state flow rate may result in approximately a 4 to 6% change in the slope dP/dt, which is a function of the pressure. This sensitivity may be increased by using a larger pressure drop data input range which can be done if the lower plunger stroke setting is increased.

For example, conditions suitable for dP/dt measurement may include one or more of the following: (1) the engine coolant is within a required temperature range, (2) the rail pressure is above a minimum threshold, (3) the injected quantity is above the minimum threshold at the current rail pressure, or (4) any potential pumping events which would overlap with the time associated with the dP/dt measurement are disabled. Taking the dP/dt measurement in a period of time during which a pumping element is not activated reduces the likelihood that the effect of pressure change resulting from the pumping event may adversely affect the dP/dt measurement associated with the injection event. Alternative methods can be implemented to reduce the likelihood of a pumping event affecting the dP/dt measurement associated with an injection event from a injector. For example, such methods may include: phasing the pumping event effects on the rail pressure so as to not overlap with the pressure changes associated with injection, temporarily dropping a pumping event, and taking measurements only when the pressure change from pumping events do not overlap with the pressure change from an injection event in the pressure measurement window. Additional conditions or criteria may be set as suitable to improve the quality of the dP/dt measurement, including but not limited to predetermined engine speeds, steady state leakage rates, and the presence of pilot injection events.

In step 204, the processor receives rail pressure measurements from the pressure sensors before and during the injection event within a measurement window. The measurement window may extend any suitable period of time before or after the start of injector command to ensure that a suitable portion of the pressure measurements during the injection event is taken for calculation. For example, the measurement window may begin shortly before the start of injector command, or it may begin shortly after the start of injector command where the time gap between the start of measurement window and the start of injector command is not significant to lose any measurement required for dP/dt calculation. In some examples, the measurement window may extend well past the end of the initial injection so as to ensure that the rail pressure during the entire injection event is measured. The measurements may be taken at sufficient frequency to provide enough datapoints for calculations. In some examples, the frequency may be greater than approximately 5 kHz, 8 kHz, 10 kHz, or 15 kHz, for example.

Steps 206 and 208 are specific to an identified injector. That is, these steps are performed for each of the injectors 118 in the system such that the values inputted as well as the values outputted are associated with the specific injector. In step 206, the processor uses a mean pressure before injection to determine a rail pressure drop range to be used in calculating a rate of change in the rail pressure, hereinafter referred to as dP/dt value, for the particular injector. The rail pressure drop range may extend a period of time during which the rail pressure experiences a substantially linear decline, and the range is sufficiently long so as to provide as many datapoints as possible for accurate measurement and calculation. In some examples, the mean pressure before injection is used as a basis for determining the rail pressure drop range, such that the start of the rail pressure drop range is defined as a certain pressure value below the mean pressure before injection, and the end of the rail pressure drop range is defined as another pressure value below the mean pressure before injection.

In step 208, the pressure drop range is used by the processor to calculate dP/dt. The value of dP/dt is the slope that corresponds to the substantially linear portion of the rail pressure measurement. The parameters used in the method 200 are graphically represented in FIGS. 4A and 4B as disclosed herein.

FIG. 2B shows the steps which may follow the method 200 that use the obtained values for dP/dt. For example, in step 210, the processor estimates, using an estimation algorithm during a current or most recent measurement event, a percent change in the measured injector's effective steady state flow rate relative to an as-new nominal injector steady state flow rate, using the dP/dt and the mean pressure before injection previously obtained in method 200. For example, the as-new nominal injector steady state flow rate refers to the steady state flow rate of that particular injector in a brand-new condition, or shortly after being implemented in a fuel system.

In step 212, the processor provides the estimated percent change to an averaging control structure to update and refine the estimation algorithm, thus forming a feedback loop which takes into account the output from the averaging control structure to update and refine the estimation algorithm. Previous steps 206 through 210 may be repeated for each of the injectors, and the outputs thereof are inputted in the averaging control structure to obtain the overall average value for the injectors. The calculated average value may be used to determine the overall error of the estimation, for example.

Subsequently, in step 214, the estimated percent change in each of the injectors' effective steady state flow rates is utilized in other controls algorithms pertaining to the injectors. In some examples, such controls algorithms include a hydraulic duration estimate algorithm which estimates the duration of the hydraulics in hydraulically actuated electronic unit injectors. In some examples, the steps in FIG. 2B may pertain to estimating the absolute value of the effective steady state flow rate (that is, the actual flow rate value, measured in grams/second, for example) instead of the percent change of such flow rate relative to the nominal flow rate (e.g., the as-new flow rate of the injector in the as-new condition).

Figure 2C:
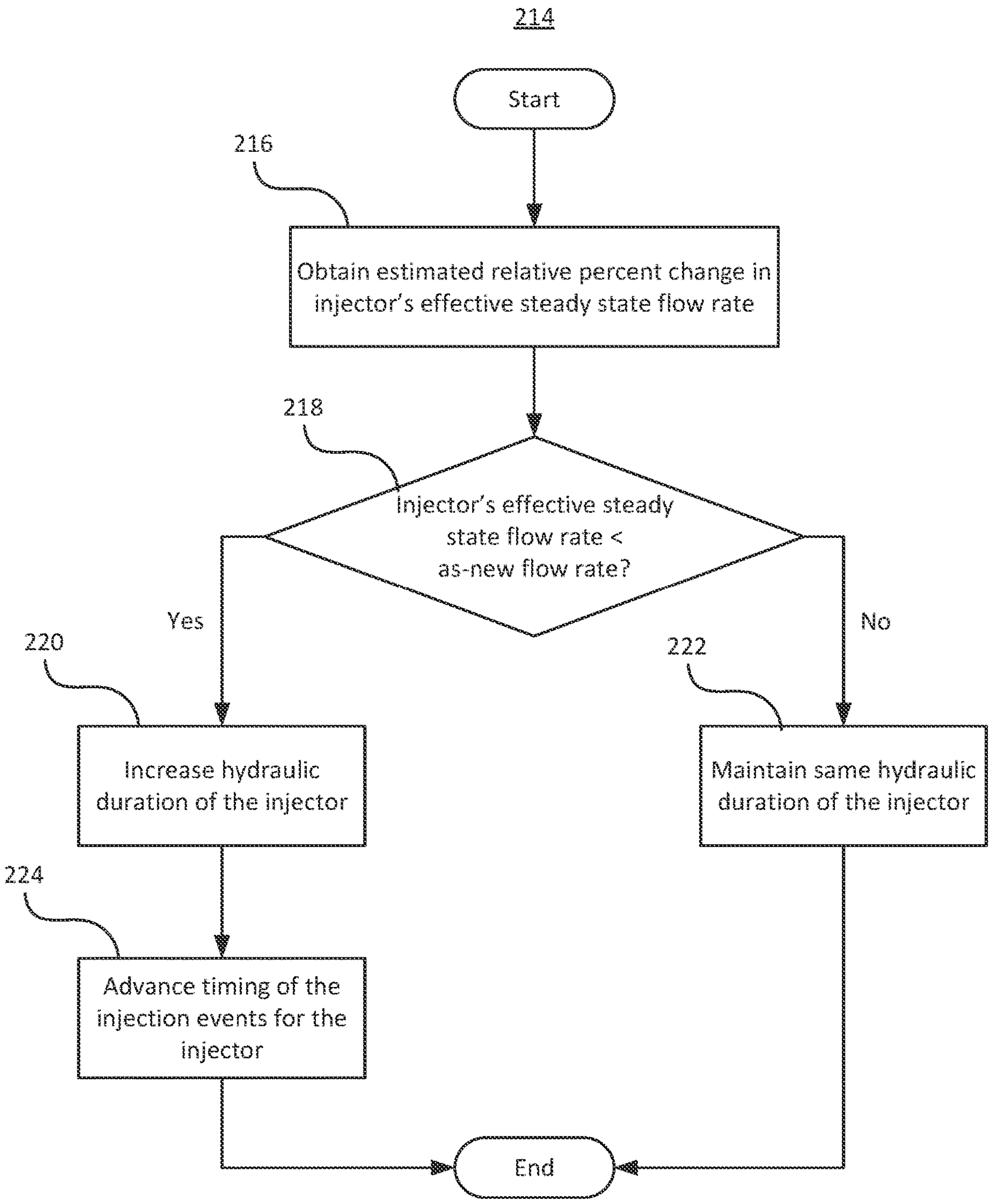
FIG. 2C shows a flow diagram of an injector controls algorithm as implemented in the method of FIG. 2B according to embodiments disclosed herein.

For example, FIG. 2C illustrates a method of performing step 214 according to some embodiments. In step 216, the processor obtains the estimated relative percent change in the injector's effective steady state flow rate, which may be directly calculated as previously explained or obtained from the memory which stores the data. In step 218, the processor determines if the estimated change in a selected injector's effective steady state flow rate shows that the injector's steady state flow rate is less than its as-new nominal flow rate. In step 220, the processor determines that the selected injector's effective steady state flow rate is less than its as-new nominal flow rate and increases the hydraulic duration of that injector that is required to deliver the commanded fueling quantity. In step 222, the processor determines that the selected injector's effective steady state flow rate is not less than its as-new nominal flow rate and maintains the same hydraulic duration of that injector. In some examples, as shown in step 224, the processor may also use this information to advance the timing of the injection events for the selected injector, in order to improve engine operation by compensating for the reduction in the steady state flow rate.

Figure 3A:
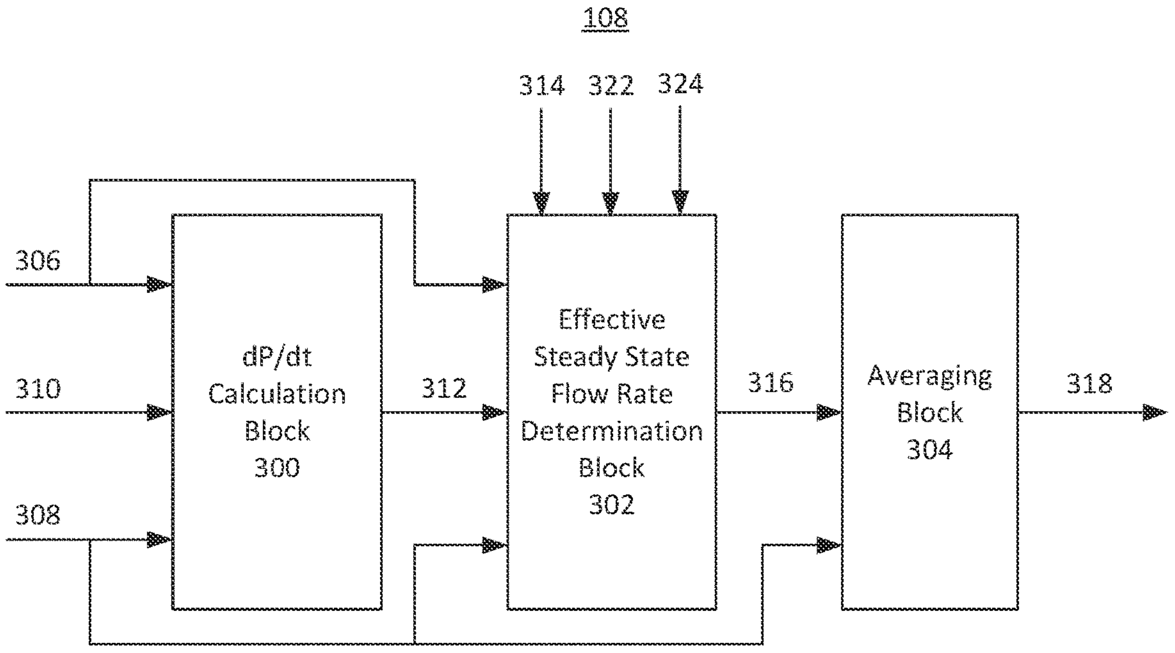
FIGS. 3A and 3B show block diagrams of the rate of change calculation block, the effective steady state flow rate determination block, and the averaging block as implemented in the processor according to embodiments disclosed herein.

FIG. 3A shows a block diagram for the data flow to and from the processor 108. The processor 108 has a dP/dt calculation block 300, an effective steady state flow rate determination block 302, and an averaging block 304. Each block may be implemented as an algorithm performed by the processor 108, with instructions for performing the calculations in the algorithm being stored in the memory 110, which is a non-transitory computer-readable or machine-readable media.

The dP/dt calculation block 300 calculates the dP/dt value for the identified injector using the method 200 as shown in FIG. 2A. The method 200 is performed using inputs including: an injector ID 306 identifying which of the injectors 118 is being referred to, a pre-injection mean pressure value 308 received from the pressure sensor 116 that is used to determine the rail pressure drop range as explained in method 200, and additional information 310 that is required by the block 300. The additional information 310 may include, but is not limited to, information used by the block 300 to determine if the conditions are met to conduct dP/dt measurement (as explained in step 202 of method 200) and a range of pressures that are used to determine the rail pressure drop range (as explained in step 204 of method 200). The output from the block 300 is a determined dP/dt value 312 to be used in the calculation in the block 302.

The effective steady state flow rate determination block 302 performs the calculations to determine the effective steady state flow rate for the identified injector. As such, the block 302 receives inputs such as the injector ID 306, the dP/dt value 312 for the identified injector 118 as calculated by the dP/dt calculation block 300, and the pre-injection mean pressure value 308. The block 302 uses these inputs to perform the algorithm and determines the effective steady state flow rate at the determined pressure value for the identified injector, which is outputted to the averaging block 304 along with the pre-injection pressure in the common rail 114. The relationship between the effective steady state flow rate and the dP/dt value 312 is also affected by factors such as the high-pressure system volume and the effective sonic speed. In some examples, corrections are applied to the raw measurement data, and the relationship between the actual effective steady state flow rate and the pre-correction effective steady state flow rate is shown below in Equation 1:

$$\frac{R_{eff}}{R_{raw}} = \frac{\left[\frac{V_{sys}}{(S_{eff})^2}\right]}{\left[\frac{V_{nom}}{(S_{ref})^2}\right]} \quad \text{(Equation 1)}$$

In Equation 1, $V_{sys}$ is a high-pressure system volume value (shown as input 322 in FIGS. 3A and 3B) and $S_{eff}$ is an effective sonic speed value (shown as input 324 in FIGS. 3A and 3B) for the measurement condition are also input to the block 302. Also included in the input 322 is a nominal value for the high-pressure system volume ($V_{nom}$), and similarly, included in the input 324 is a reference value for the effective sonic speed ($S_{ref}$). $R_{raw}$ is a raw data value of effective steady state flow rate before any volume and sonic speed correction is applied, and $R_{eff}$ is an actual effective steady state flow rate. Using Equation 1, the effective steady state flow rate ($R_{eff}$) can be adjusted both for the high-pressure system volume ($V_{sys}$) relative to the nominal value of the high pressure system volume ($V_{nom}$) and for the square of the effective sonic speed ($S_{eff}$) relative to the square of the reference value for the effective sonic speed ($S_{ref}$). The effective sonic speed value of input 324, which is the speed at which sound is known to travel at the operating condition of the high-pressure system, may be calculated at the measurement condition by any suitable method, such as a function or a lookup table that is based on the pressure value, based on the pressure value and the effective fluid temperature in the high pressure system, or based on the measured natural frequency or frequencies as measured by the pressure sensor. In some examples, the input information 310 may include data from a lookup table stored in a memory and accessible by the processor 108 such that the lookup table specifies the rail pressure drop range for the identified injector 118.

The effective steady state flow rate determination block 302 uses a dP/dt value 312 determined by the block 300 as an input, in addition to the injector ID 306 and the pre-injection mean pressure 308, to determine an output 316. The output 316 may be any one or more of the following: the effective steady state flow rate of the identified injector at the determined pressure level, the percent change in the identified injector's effective steady state flow rate relative to the as-new nominal effective steady state flow rate as predetermined for the injector, a ratio of the pilot valve rate shape to the injection rate shape at the determined pressure level, and/or a ratio of the injection rate shape to the total rate shape at the determined pressure level.

In block 302, the processor 108 performs a calculation using a formula or equation (for example, Equation 2) to determine an effective steady state flow rate change (R) with respect to a nominal injector steady state flow rate. The nominal injector steady state flow rate may be the nominal as-new flow rate that is initially measured when the injector is manufactured or which the manufacturer of the injector has defined. The Equation 2 is defined as:

$$R = A + \frac{B}{P_{mean}} + C\left(\frac{dP}{dt}\right) + \frac{D}{(P_{mean})^2} + E\left(\frac{dP}{dt}\right)^2 + \frac{F\left(\frac{dP}{dt}\right)}{P_{mean}} \quad \text{(Equation 2)}$$

where A, B, C, D, E, and F are all fixed coefficients that are unique or specific to each injector 118. That is, for each identified injector 118, there is a separate set of coefficients that is different from the other injectors 118 connected to the common rail accumulator 114. $P_{mean}$ is the pre-injection mean pressure 308, and dP/dt is the value 312 determined by block 300.

The injector-specific fixed coefficients A through F may be obtained from the memory 110 as coefficient inputs 314 by the processor 108 to be used in the block 302. In some examples, these coefficients may be determined in calibration from measured pressure drop slope values (dP/dt) on any engine with sufficient rail pressure sampling capability by the ECM, including operating field engines. The coefficients differ for each injector because if the same coefficients were used in Equation 2 for all injectors, the average error in the estimated effective steady state flow rate may be 8% or more according to some experimental and simulated data. The largest errors are typically expected to be measured at the injectors located at or near the end of the common rail (such as injector no. 1 or 6 in FIG. 1, for example), causing a difference in the hydraulic layout for this particular injector with respect to the other injectors. In some examples, the coefficients may also depend on the input data range of the rail pressure data set. The accuracy of the estimated effective steady state flow rate may further be improved by using the appropriately weighted effected steady state flow rate estimates from multiple input rail pressure data ranges, for example.

In the averaging block 304, the value of effective steady state flow rate 316 at a determined pressure for the identified injector 118 and the pre-injection mean pressure 308 are used as inputs to calculate an averaged or normalized effective steady state flow rate 318 for the identified injector 118. For example, the estimates of the individual effective steady state flow rate 316 from multiple operating regions and pressures are averaged, for example during engine operation, to obtain the on-engine effective steady state flow rate for each identified injector 118. The average effective steady state flow rate 318 for the identified injector 118 may then be stored in the memory 110 for future access and/or used by the processor 308 such as an ECM to improve injector performance flexibility or to reduce warranty of the fuel injection system. Furthermore, the average effective steady state flow rate 318 may also be used to improve engine performance and reduce engine emissions.

The effective steady state flow rate estimation method as implemented by the block 302 may also enable increased rate shape flexibility in fuel injector designs, since such injector designs with a faster opening rate shape slope may be obtained by: (1) reducing the lower plunger top diameter to reduce the pilot valve drain flow quantity, and (2) increasing the lower plunger stroke to eliminate a high-fueling region and the associated high-overshoot transition and eliminate one of the fueling regions from the closed loop fueling control. Accordingly, the per-cylinder effective steady state flow rate and the injected hydraulic duration may be measured on the engine.

Figure 3B:
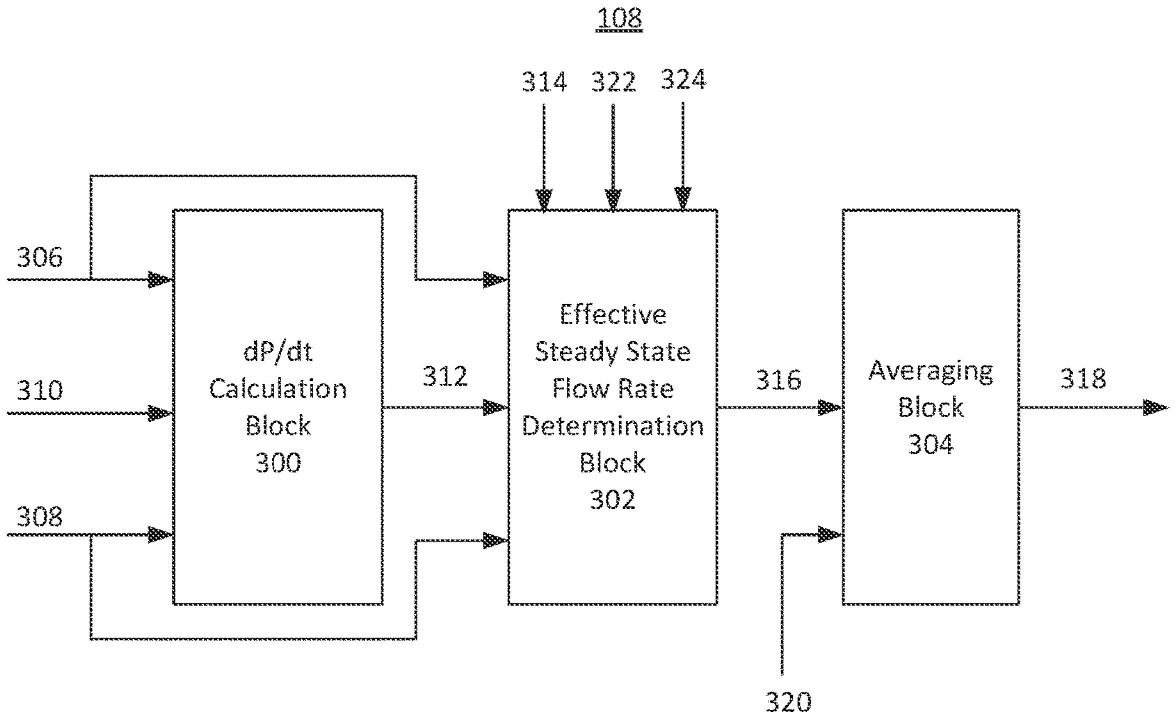

In FIG. 3B, the averaging block 304 is shown to use a different input from the same block shown in FIG. 3A. Specifically, the block 304 uses a mean pressure 320 within the dP/dt measurement window to determine the normalized effective steady state flow rate for the identified injector 118 instead of the pre-injection mean pressure 308.

Figure 4A:
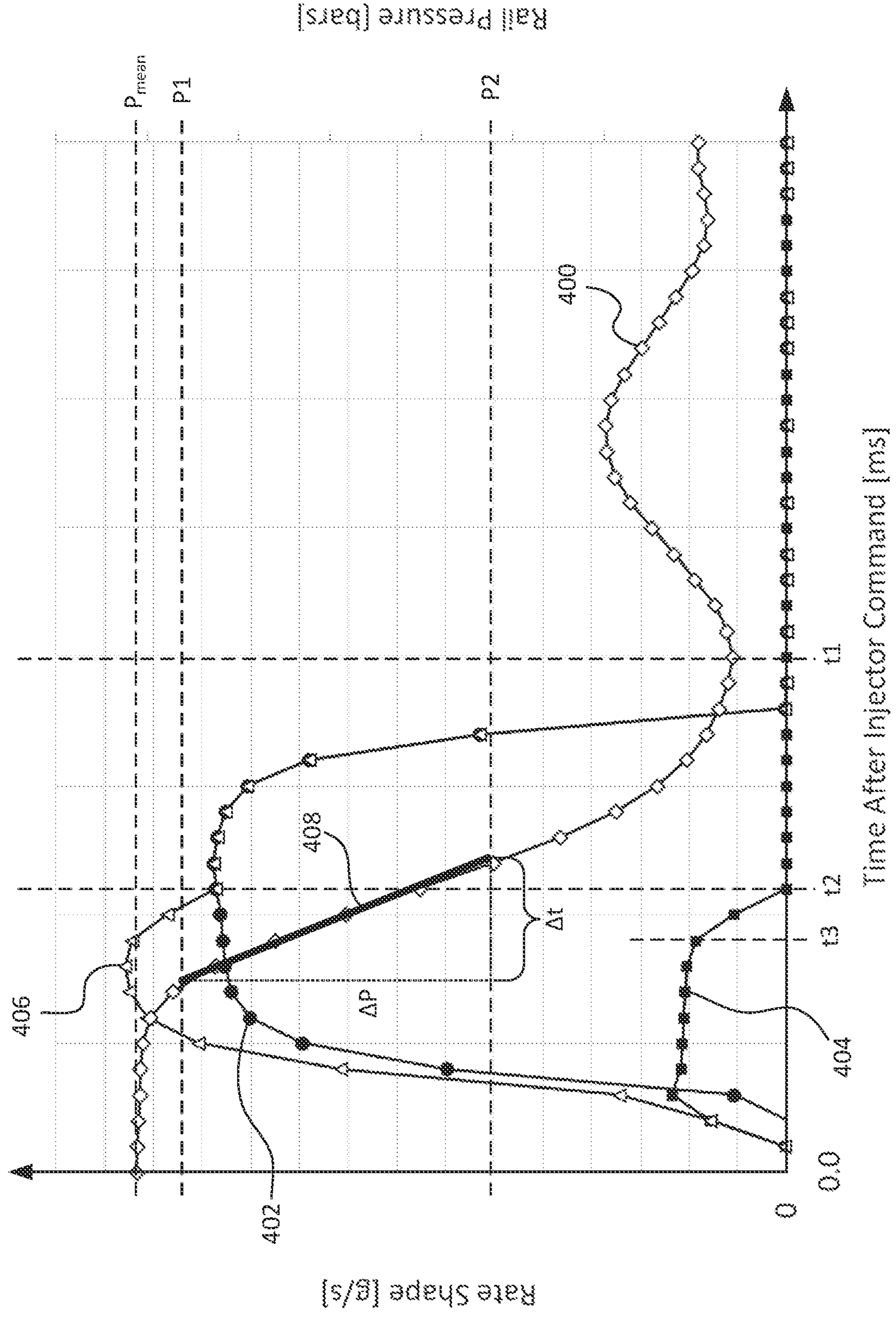
FIGS. 4A and 4B respectively show a graph of rate shape vs time after injector command and a graph of rail pressure vs time after injector command with two different pre-injection mean pressure value according to embodiments disclosed herein.
Figure 4B:
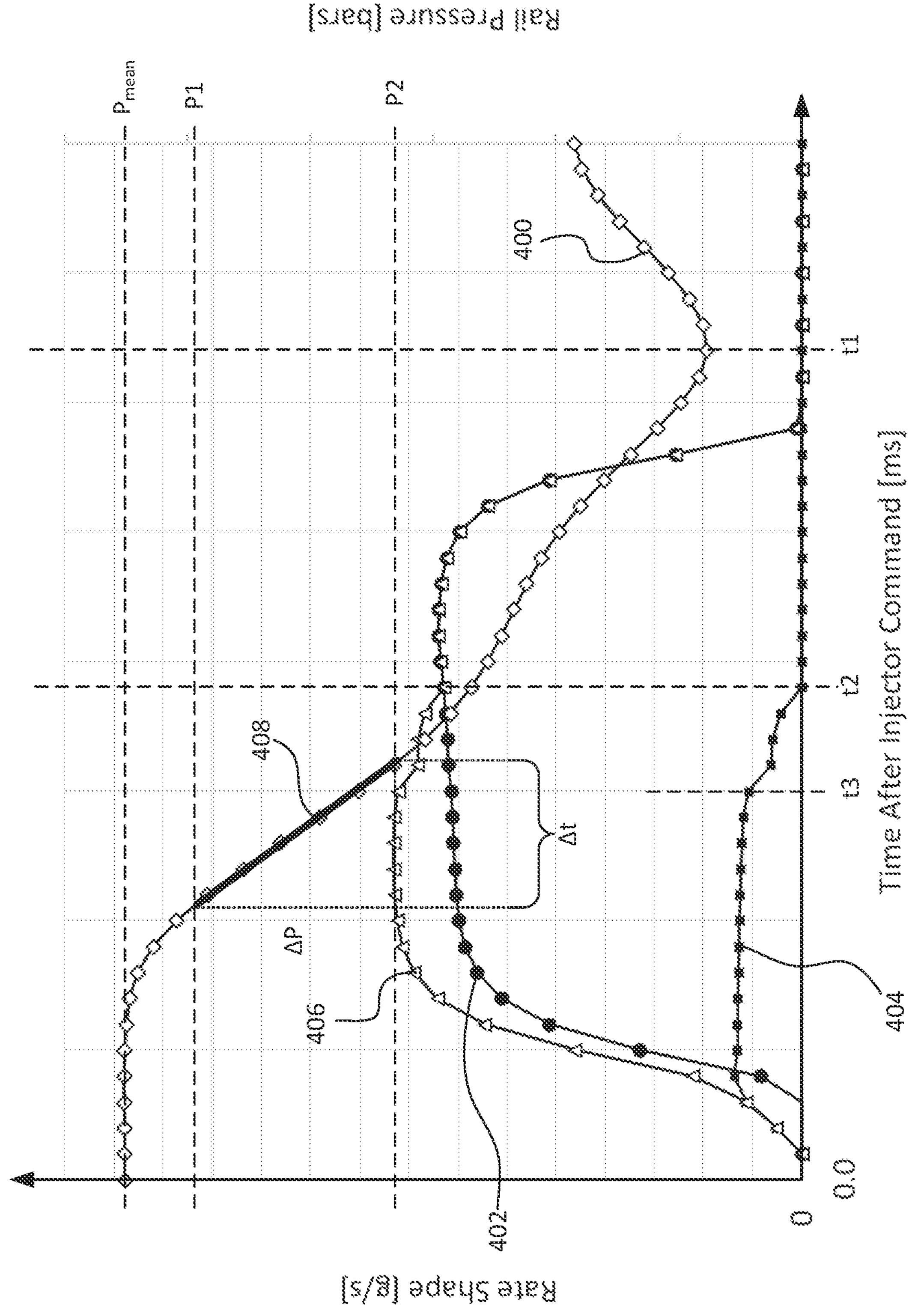

FIGS. 4A and 4B show two different graphs of rate shape vs time after injector command and rail pressure vs time after injector command at two different starting rail pressures. In FIG. 4A, the starting rail pressure at the time of injector command (t=0) is higher than in FIG. 4B; that is, the pre-injection mean pressure value $P_{mean}$ is greater in FIG. 4A than in FIG. 4B, i.e. $P_{mean}$ (FIG. 4A)>$P_{mean}$ (FIG. 4B). Each graph shows the mean rail pressure before injection (or pre-injection mean pressure value) $P_{mean}$, as well as a rail pressure measurement curve 400, an injection rate shape 402, a pilot valve rate shape 404, a total rate shape 406 (sum of the injection rate shape 402 and the pilot valve rate shape 404), and a dP/dt slope 408 which extends within the dP/dt calculation range as determined by the two pressures (P1 and P2) as explained herein.

In each graph, there are two pressure values in addition to the pre-injection pressure value $P_{mean}$: an initial pressure (P1) which defines the start of a dP/dt calculation range and a final pressure (P2) which defines the end of the dP/dt calculation range. Furthermore, in each graph, the dP/dt measurement window extends from t=0 (at the time of injector command) to t=t1, which defines the end of the measurement window. Additionally, t2 is defined as the time when the pilot valve rate shape 404 ends or reaches 0 g/s after the initial injection, and t3 is defined as when a lower plunger hovering begins, where the lower plunger in the plunger assembly of the injector hovers or floats within the central bore when fully lifted, causing the injector to reduce the pilot valve drain flow rate. Alternatively, t3 may be defined as when the pilot valve begins to close for shorter injected fueling quantities at which the lower plunger hovering begins. In each graph, $P_{mean}$>P1>P2, and t1>t2>t3. The dP/dt value can be determined by dividing the change in rail pressure (ΔP) by the change in time (Δt) in the slope 408.

The measurement window defines the time frame during which measurements of the rail pressure 400 are taken. The length of the window must extend long enough to provide a sufficient number of datapoints to reliably calculate the dP/dt slope 408 for the identified injector 118, and the frequency of the measurements must also be sufficiently high so as to provide the processor with enough datapoints to identify a sufficiently linear decline in the rail pressure 400 to perform the dP/dt calculation.

After the rail pressure 400 measurements are taken, the measurements taken between P1 and P2 are considered for dP/dt calculation. The starting pressure P1 is a predetermined value of pressure below the $P_{mean}$ value, and the end pressure P2 is yet another predetermined value of pressure below the $P_{mean}$ value. For illustrative purposes only, in some examples, the difference between $P_{mean}$ and P1 (also referred to as the first pressure drop) may be between about 5 bars (500 kPa) to about 10 bars (1 MPa), and the difference between $P_{mean}$ and P2 (also referred to as the second pressure drop) may be between about 20 bars (2 MPa) to about 40 bars (4 MPa).

The first pressure drop may be determined so as to minimize the effect of variations in the opening rate shape slope of the injector, and the second pressure drop may be determined to reduce the likelihood of including measurement datapoints that would negatively affect the dP/dt calculation. In order to reduce variations in the injector's lower plunger stroke setting affecting the initiation of this flow rate drop from influencing the dP/dt measurement, it is beneficial to limit the upper range of the rail pressure data, hence the first pressure drop which causes the initial pressure measurements, which remains relatively static at first, to be excluded from the dP/dt calculation. In some examples, the dP/dt value may be calculated after performing a linear regression on the measured rail pressure values in the dP/dt calculation range, and the second pressure drop may be selected so as to avoid reducing a coefficient of determination ($R^2$) for the linear regression with respect to the measured datapoints, such that $R^2$ value remains as close to 1 as possible.

Each pressure drop value may be predetermined or calibrated based on prior injection events, for example, where the value is unique to the specific injector ID. Therefore, each injector may have a different pressure drop value assigned thereto. In some examples, the pressure drop values may be accessed via an equation or table (for example, lookup table stored in the memory) by the processor.

The injector reduces the pilot valve drain flow rate when the lower plunger reaches full lift and hovering is initiated, or when the pilot valve begins to close when the injection quantities reach below a threshold quantity at which the lower plunger hovering begins. At this time, the net flow rate of the injector (which is the sum of injected and pilot valve drain flow rates) drops, which affects the rate of pressure drop. This corresponds to the decrease in pilot valve rate shape 404 from t3 to t2. In some examples, the time gap between t3 and the time when the rail pressure 400 reaches P2 is referred to as a delay from the start of lower plunger hovering until the effect thereof first influences rail pressure 400. This delay is caused mainly by the latency in the sensor reacting to the lower plunger hovering, which may be a fraction of a millisecond in length, and the rail pressure 400 is not affected until the hovering event information is transmitted to the rail pressure sensor 116. The length of the delay is controlled by the distance from the operating injector 118 to the rail pressure sensor 116 and the sonic speed of the fuel at the operating pressure and temperature. As shown in FIGS. 4A and 4B, the delay may differ for different initial rail pressures at the start of injector command. Furthermore, the time at which the rail pressure 400 reaches P2 may be after t=t2 as shown in FIG. 4A or before t=t2 as shown in FIG. 4B.

In some examples, the sensitivity of the change in the rail pressure slope drop can be increased relative to that of the injector if the lower plunger stroke is increased in order to remove the effect of the reduction rail pressure slope with the onset of reduced pilot valve flow with lower plunger hovering. A preferred maximum rail pressure drop input data range limit may be one that maximizes the average rail pressure drop slope sensitivity to change the effective steady state flow rate. According to some simulations, when the sensitivity of the change in the rail pressure slope drop was limited by lower plunger stroke for the injector, the ratio of the rail pressure slope change to a change in the effective steady state flow rate is approximately 0.35 to 0.55. In some examples, the ratio of the rail pressure slope change to a change in the effective steady state flow rate may be increased to approximately 1.15 to 1.65 when the lower plunger stroke is increased. In some examples, the input rail pressure data range which can be used in the estimation of the effective steady state flow rate may be set to include more rail pressure drop data when the lower plunger is increased.

The effect of increasing the lower plunger stroke includes increasing the number of datapoints that can be measured for the rail pressure 400 to be included in the dP/dt slope 408 calculation. That is, similar to how a lower pre-injection pressure causes the rate shapes 402, 404, and 406 to be more stretched out along the time domain (x-axis) in FIG. 4B as compared to those in FIG. 4A, the increase of lower plunger stroke similarly stretches the rate shapes 402, 404, and 406 and also causes an increase in the pressure drop from $P_{mean}$ to P2 as compared to both FIGS. 4A and 4B. For example, if the pressure drop from $P_{mean}$ to P2 ranged from 23 to 31 bars in FIGS. 4A and 4B, the pressure drop from $P_{mean}$ to P2 with an increased lower plunger stroke may be as high as 35 bars.

With rate shapes that are more stretched out and a greater gap between P1 and P2, the slope dP/dt calculation would then include more datapoints to consider, thereby increasing the accuracy of the calculation. For such examples with increased lower plunger strokes, the injection quantity is sufficiently high so that the rail pressure input data range as measured at the rail pressure transducer is minimally affected by the closing of the pilot valve which reduces the net flow rate of the injector which is the sum of injected and pilot valve drain flow rates. The rail pressure drop input range which results in an increased sensitivity of the average slope dP/dt to the change in effective steady state flow rate may align with a natural inflection point in the rail pressure which is dependent on the system configuration, the injector configuration, and the effective steady state flow rate. In some examples, a 10% reduction in the effective steady state flow rate from may produce approximately a 13% reduction in the average slope dP/dt.

Figure 6:
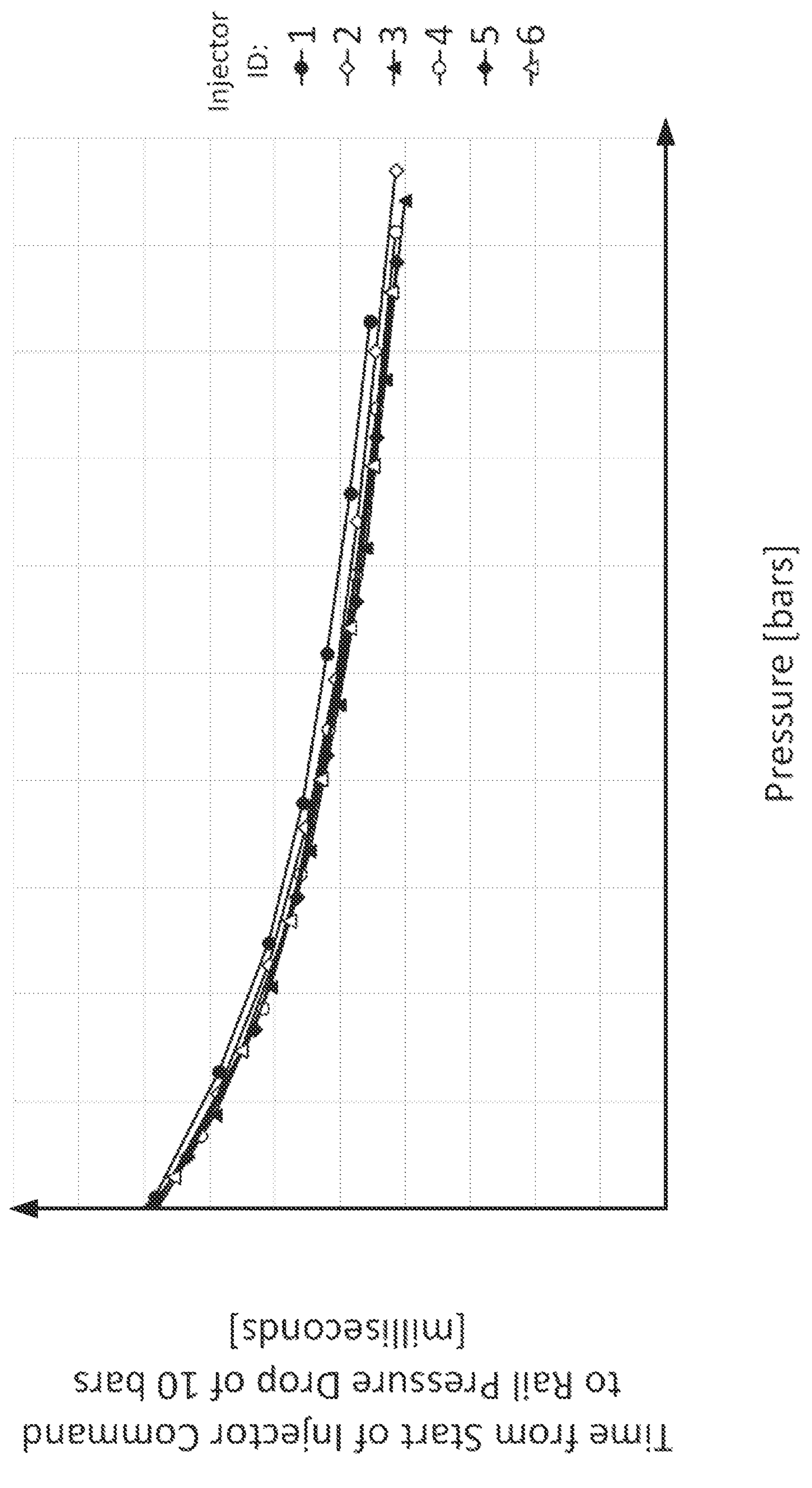
FIG. 6 shows a graph depicting the relationship between the time from start of injector command to the rail pressure drop reaching 10 bars as a function of pressure for each injector in the fuel injection system according to embodiments disclosed herein.

In some examples, instead of determining the pressure drops to P1 and P2 as described herein, a time difference from the start of the fueling command to the time for the rail pressure to drop to a selected level below the starting rail pressure may be used as an estimation method for the start of injection delay of an injector. Since the time from the start of injector command to the rail pressure drop reaching a predetermined pressure level (for example, 10 bars below the $P_{mean}$) generally decreases at a predictable curve as the starting rail pressure (or $P_{mean}$) increases. As shown in FIG. 6, for example, the different injectors 118 (e.g., injector no. 1 through no. 6 as shown in FIG. 1) follow similar curves in the graph of time from start of injector command to the rail pressure drop reaching 10 bars vs initial pressure before injection. As such, the delay in time may be described as a function of the injector and the pressure. In some examples, an on-engine estimation of the start of injection delay may consider the distance from each injector to the rail pressure transducer and the sonic speed of the pressurized fuel at the operating pressures and temperatures.

Figure 5:
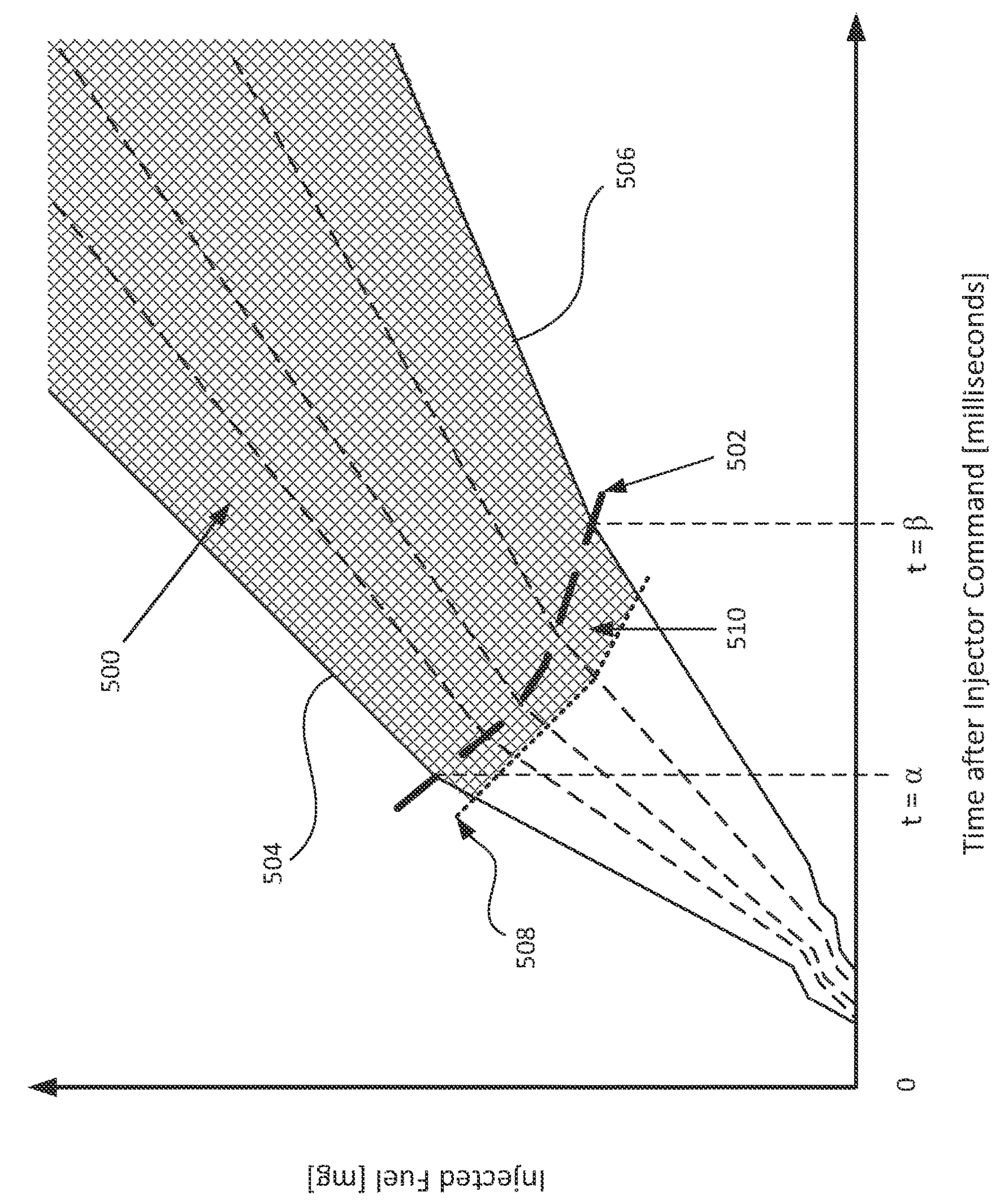
FIG. 5 shows a graph of an injection region used for calculating the rate of change in the rail pressure, as defined by the different operating curves and a starting line of hovering for the lower plunger of the injector according to embodiments disclosed herein.

Referring to FIG. 5, a graph of the amount of injected fuel vs the time after injection command as performed at different operating pressures is shown. The graph shows an injection region 500 used for dP/dt data calculation as previously mentioned, a bold broken line showing a starting line of hovering 502 for each of the different curves, an operating curve 504 at high operating pressure, and an operating curve 506 at low operating pressure. The starting line of hovering 502 is defined by plotting the inflection points in the slopes, for example a first inflection point at $t=\alpha$ in the slope of the curve 504 and a second inflection point at $t=\beta$ in the slope of the curve 506 as well as all curves therebetween (as shown with broken lines).

The broken lines located between the external curves 504 and 506 show the different operating curves pertaining to different pressure levels between the high operating pressure operating curve 504 and the low operating pressure operating curve 506, which set the boundaries for the injection region 500. The region 500 as shown has a minimum threshold 508 (shown with dotted line) which defines a region with lower amount of injected fuel than as defined for the starting line of hovering 502. As such, the injection region 500 in which the dP/dt data calculation can be performed includes a section or zone where the injected fuel amounts do not initiate hovering of the lower plunger in the injector. Hereinafter, the section of the injection region 500 located between the minimum threshold 508 and the starting line of hovering 502 for the injector is defined as a non-hovering zone 510.

Advantages in using the non-hovering zone 510 to perform dP/dt data calculation include improved accuracy in the calculation. In some examples, the accuracy of using the dP/dt slope to provide an accurate estimate of the effective steady state flow rate is superior to those using alternative methods which depend on taking a ratio of pressure difference taken over the entire time frame in which an associated duration of the injection process is known to take place. Specifically, such alternative methods are prone to take pressure measurements beyond those that take place within the associated duration of the injection process, and the resulting calculation can also be negatively affected by noise sources such as non-linear overshoots in the sections of the injection region 500 at or above the starting line of hovering 502 (this region is also referred to as a high-fueling region), non-linearities in the high-fueling region as a result of end-of-injection non-linearities, and possible inability to getting sufficient data well into the high-fueling region due to engine duty cycle operation constraints.

Figure 7:
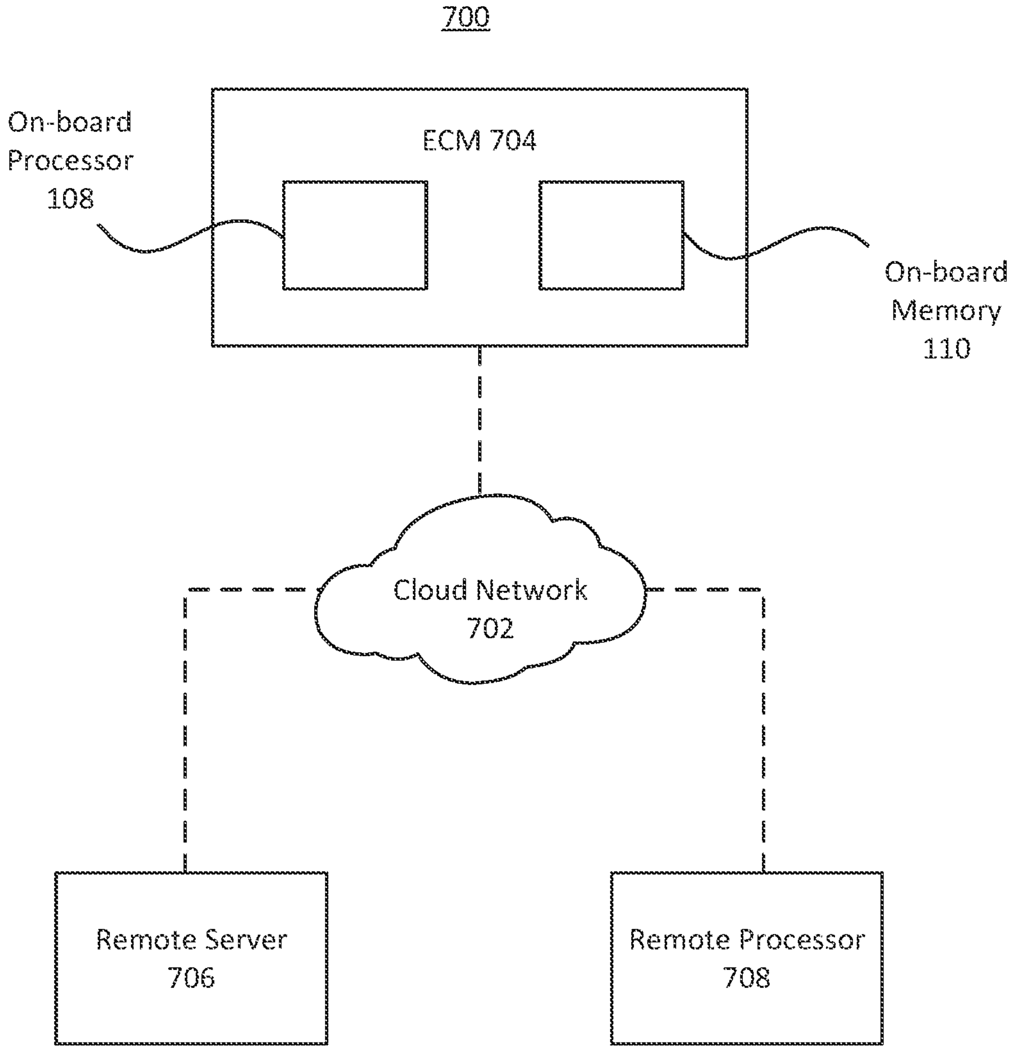
FIG. 7 shows a schematic diagram of a computing system using a cloud network according to embodiments disclosed herein.

FIG. 7 shows an example of a computing system 700 which implements the methods as disclosed herein. The computing system 700 has a cloud network 702 which provides a means of wireless data communication (e.g., a wireless communication network) to connect the engine's ECM 704 with a remote data server 706 and a remote processor 708. Therefore, in some examples, instead of an on-board processor 108 of the controller 102 performing the dP/dt calculation and effective steady state flow rate estimation as disclosed herein, the calculation and estimation are performed by the remote processor 708 which wirelessly receives the necessary inputs (for example, 306, 308, 310, 314, 320, 322, and/or 324 as shown in FIGS. 3A and 3B) and provides the output 318 to the ECM 704. The on-board processor 108 may be defined as the processor that is physically installed on a vehicle that includes the engine 104 and/or physically coupled (for example, via wires) with any of the components of the components shown in FIG. 1, such as the pressure sensor 116, the fuel pump 106, and/or the injectors 118. Some of the inputs, for example the inputs 322 and 324 for Equation 1 the additional inputs 310 and the coefficients 314 for Equation 2, may be provided by the remote server 706 instead of being stored in the on-board memory 110. Alternatively, the ECM 704 may be capable of performing the calculation and estimation using the on-board processor 108 and relies on the cloud network 702 solely to obtain data such as inputs and coefficients from the remote server 706, as needed.

Advantages in using the dP/dt value as determined using methods disclosed herein to estimate the effective steady state flow rate associated with the identified injector, include decreased average error in the estimated effective steady state flow rate (or the percent change thereof relative to the as-new nominal effective steady state flow rate of the injector) for all the injectors. That is, even if there are errors measured in the estimated percent change in effective steady state flow rate of an injector relative to the nominal flow rate associated with the particular injector with each dP/dt measurement, the errors from all the injectors (for example, injector no. 1 through no. 6 in FIG. 1) would average to less than 1%, less than 0.5%, or less than 0.2% in some examples.

Although the examples and embodiments have been described in detail with reference to certain preferred embodiments, variations and modifications exist within the spirit and scope of the disclosure as described and defined in the following claims.

What is claimed is:

1. A method implemented in a fuel injection system comprising a plurality of injectors coupled with a common rail, the common rail coupled with a pressure sensor, and the pressure sensor coupled with a processor, the method comprising:

identifying, by the processor, one of the injectors to calculate a pressure change rate of the common rail associated therewith;

receiving, by the processor, pressure measurements of the common rail from the pressure sensor before and during an injection event within a measurement window;

using, by the processor, a pre-injection mean pressure of the common rail to determine a rail pressure drop range that is specific to the identified injector; and calculating, by the processor, the pressure change rate associated with the identified injector based on the pressure measurements of the common rail taken during the rail pressure drop range.

2. The method of claim 1, further comprising:

estimating, by the processor, an effective steady state flow rate of the identified injector based on the calculated pressure change rate associated with the identified injector.

3. The method of claim 2, further comprising:

calculating, by the processor, a plurality of pressure change rates associated with the plurality of injectors; and estimating, by the processor, a plurality of effective steady state flow rates of the injectors based on the plurality of calculated pressure change rates associated with the injectors.

4. The method of claim 3, further comprising:

calculating, by the processor, an average effective steady state flow rate based on the plurality of effective steady state flow rates; and using, by the processor, the average effective steady state flow rate to determine an error in the estimated effective steady state flow rates of the injectors.

5. The method of claim 3, further comprising:

using, by the processor, the effective steady state flow rates of the injectors in an injector control algorithm.

6. The method of claim 1, further comprising:

estimating, by the processor, a percent change in an effective steady state flow rate of the identified injector relative to a nominal steady state flow rate of the identified injector based on the calculated pressure change rate associated with the identified injector.

7. The method of claim 1, wherein the rail pressure drop range is determined using a first pressure drop and a second pressure drop greater than the first pressure drop.

8. The method of claim 1, wherein the pressure measurements of the common rail are taken in a non-hovering zone of the injector in which an injected fuel amount thereof does not initiate hovering of a lower plunger in the injector.

9. The method of claim 1, further comprising:

determining, by the processor, that a suitable condition is met to receive the pressure measurements, wherein the condition includes at least one of the following:

(1) an engine coolant is within a required temperature range, (2) a pressure of the common rail is above a minimum threshold, (3) an injected fuel amount is above the minimum threshold, or (4) any potential pumping events which would overlap with the measurement window are disabled.

10. The method of claim 1, wherein the pressure measurements are received at a frequency which provides the processor with enough datapoints to identify a sufficiently linear pressure decline in the pressure measurements for calculating the pressure change via a linear regression.

11. A fuel injection system comprising:

a common rail;

a pressure sensor coupled with the common rail;

a plurality of injectors coupled with the common rail; and a processor coupled with the pressure sensor and a non-transitory computer readable medium storing thereon instructions that, when executed by the processor, cause the processor to perform the method according to any one of claims 1 through 10.

12. A vehicle comprising:

a fuel injection system according to claim 11; and an engine coupled with the fuel injection system and comprising:

a crankshaft, and a plurality of cylinders coupled with the crankshaft via a corresponding plurality of connecting rods, the plurality of cylinders including a plurality of pistons configured to cause the crankshaft to rotate via the plurality of connecting rods in response to receiving fuel from the plurality of injectors.

13. The vehicle of claim 12, wherein the processor is an on-board processor physically coupled with the pressure sensor.

14. The vehicle of claim 12, wherein the processor is a remote processor communicably coupled with the vehicle via a wireless communication network and is configured to receive the pressure measurements of the common rail from the pressure sensor via a secondary on-board processor physically coupled with the pressure sensor.

15. The vehicle of claim 14, wherein the non-transitory computer readable medium is a remote data server.

* * * * *